United States Patent [19]

Su-Chen

[11] Patent Number: 5,979,269
[45] Date of Patent: Nov. 9, 1999

[54] BICYCLE FOOT REST

[75] Inventor: Lin Su-Chen, Taichung, Taiwan

[73] Assignee: Iou Good Jyi Industry Co., Ltd., Chang Hua Hsien, Taiwan

[21] Appl. No.: 09/108,363

[22] Filed: Jul. 1, 1998

[51] Int. Cl.⁶ ............................... G05G 1/18; G05G 5/06
[52] U.S. Cl. ............................... 74/564; 74/527; 280/291
[58] Field of Search ........................ 74/563, 564, 551.1, 74/551.8, 551.2, 551.7, 527, 526, 594.7; 280/291

[56] References Cited

U.S. PATENT DOCUMENTS

| | | | |
|---|---|---|---|
| 1,635,473 | 7/1927 | Gibson | 74/564 |
| 4,041,798 | 8/1977 | Shinozaki et al. | 74/564 X |
| 4,229,039 | 10/1980 | Day | 280/650 X |
| 5,301,570 | 4/1994 | Li | 74/551.1 |
| 5,354,086 | 10/1994 | Mueller | 280/291 |
| 5,356,237 | 10/1994 | Sung | 74/551.1 X |
| 5,456,135 | 10/1995 | Li | 74/551.7 |
| 5,779,254 | 7/1998 | James et al. | 280/291 |

FOREIGN PATENT DOCUMENTS 20413   8/1907   United Kingdom ..................... 74/564

*Primary Examiner*—Vinh T. Luong
*Attorney, Agent, or Firm*—Harrison & Egbert

[57] ABSTRACT

A bicycle foot rest is composed of a cramp provided with a shaft body which has a halved ring on the edge. Said halved ring provided with a fixed groove and a halved groove at an appropriate location thereby. A screw fastened therewith between the fixed groove and the halved groove. A revolving body provided a plane with a tapper hole. A frame rod that provided with a receiving hole at the top end thereof uses a screw tube to engage with the revolving body. A guide tube provided cross through inside with the screw tube. A halved head provided with a longitudinal trough hole on the surface. A tension member located in the receiving hole strengthened to the bottom end of guide tube. An elastic member and a steel ball are put orderly into the trough hole of the guide tube. The steel ball is forced to strengthen to the halved ring of the shaft body with a support by the elastic member, and further to strengthen to the fixed groove or to the halved groove.

3 Claims, 4 Drawing Sheets

BICYCLE FOOT REST

FIELD OF THE INVENTION

The present invention relates generally to a foot rest, and more particularly to a bicycle foot rest.

BACKGROUND OF THE INVENTION

The conventional bicycle foot rest is generally provided with a frame rod fastened with a spring at the upper end thereof. There is provided with a retaining piece on the limited edge of the frame base so that the frame can be revolved and stood firmly in the place. However, such a prior art is defective in design for out-looking and is difficult for moving.

SUMMARY OF THE INVENTION

The primary objective of the present invention is therefore to provide a good looking designed and enabling to use in long period time compared to the bicycle foot rest of the prior art described above.

In keeping with the principle of the present invention, the foregoing objective of the present invention is attained by a foot rest consisting of a fixed groove of a shaft body halved ring, a halved groove, and a screw which is located at the opposite edge of a cramp. The plane revolving body is provided pivotally with a tapper hole, the frame rod uses its receiving hole of a screw tube fastened with the revolving body. In addition, inside of the screw tube is further provided with a steel ball, an elastic member of a guide tube, and a tension member.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
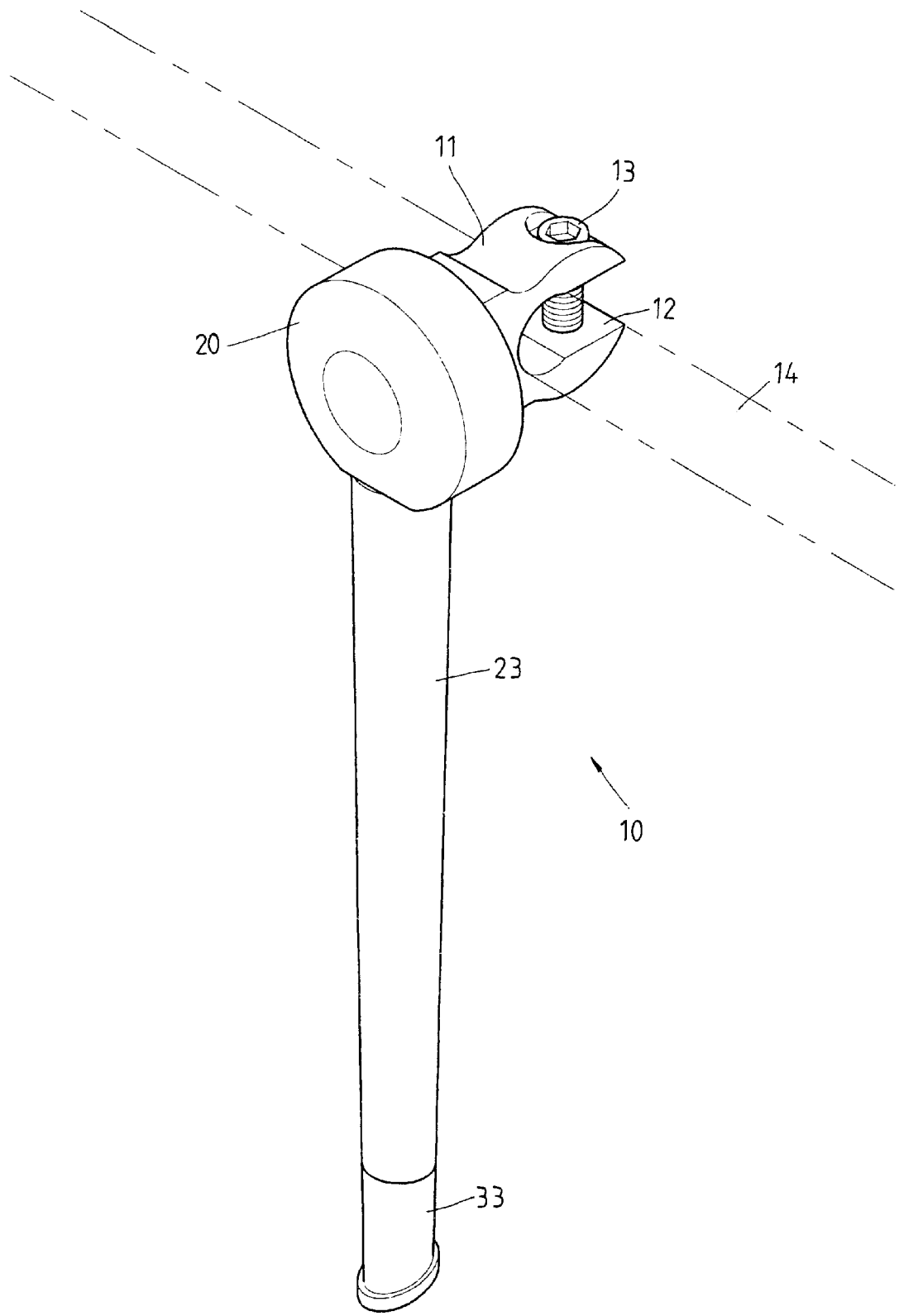
FIG. 1 snows a perspective view of the present invention.
Figure 2:
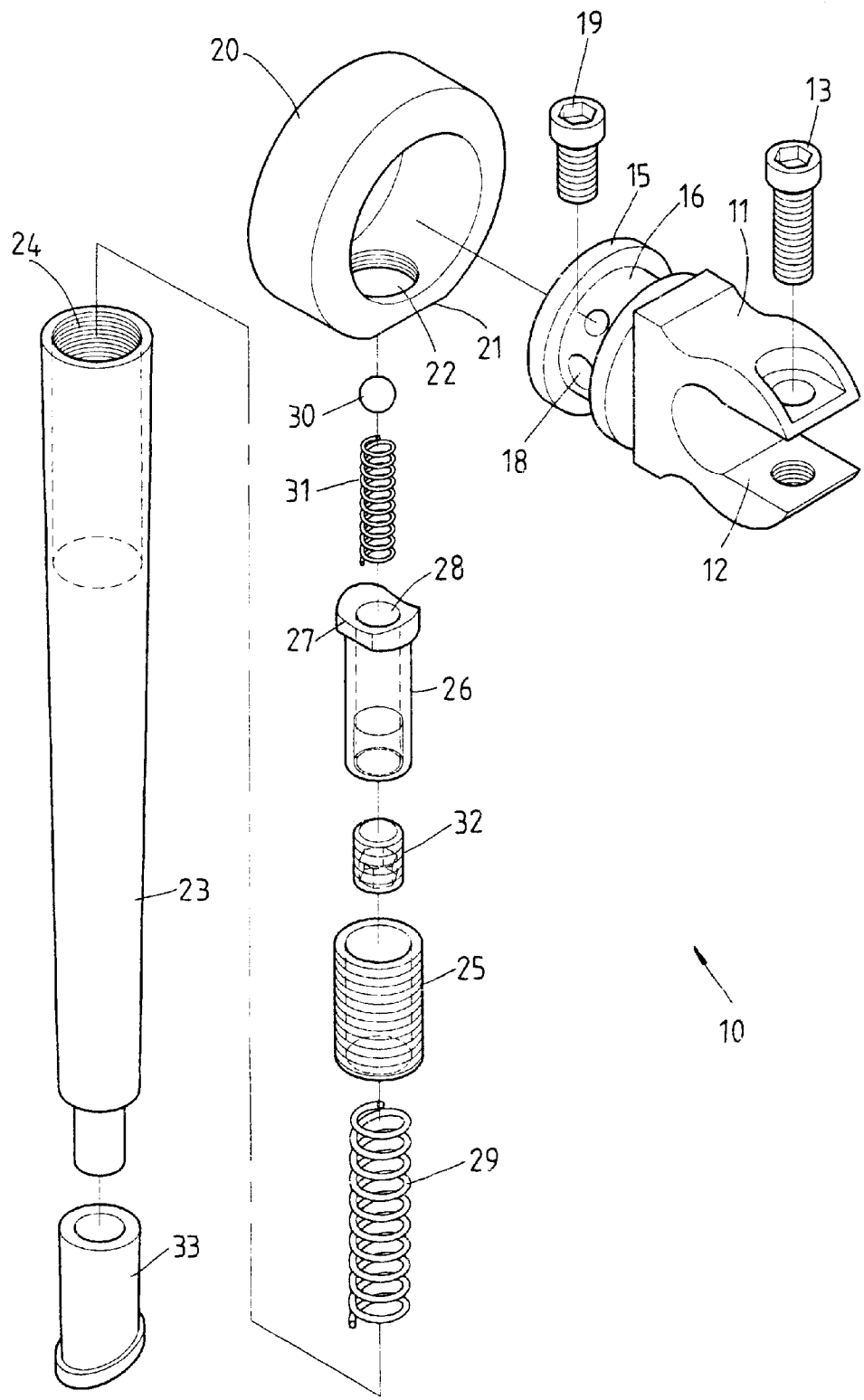
FIG. 2 shows an exploded view of the present invention.

As shown in FIGS. 1 and 2, a bicycle foot rest embodied in the present invention is composed of:

A cramp 11, an open edge 12 of the cramp 11 is fastened with a screw 13. The cramp 11 is located fixedly on the bicycle frame rod body 14. At the opposite side of the open edge 12 of said cramp 11 provided with a shaft body 15 which has a halved ring 16. At an appropriate location of the halved ring 16 is provided with a fixed groove 17 and a halved groove 18. There is a screw 19 fastened therewith between the fixed groove 17 and the halved groove 18.

A revolving body 20 is fastened pivotally with the shaft body 15 of the cramp 11. The revolving body 20 is provided with a plane 21 which is connected through a tapper hole 22 inside of the revolving body 20.

Figure 3:
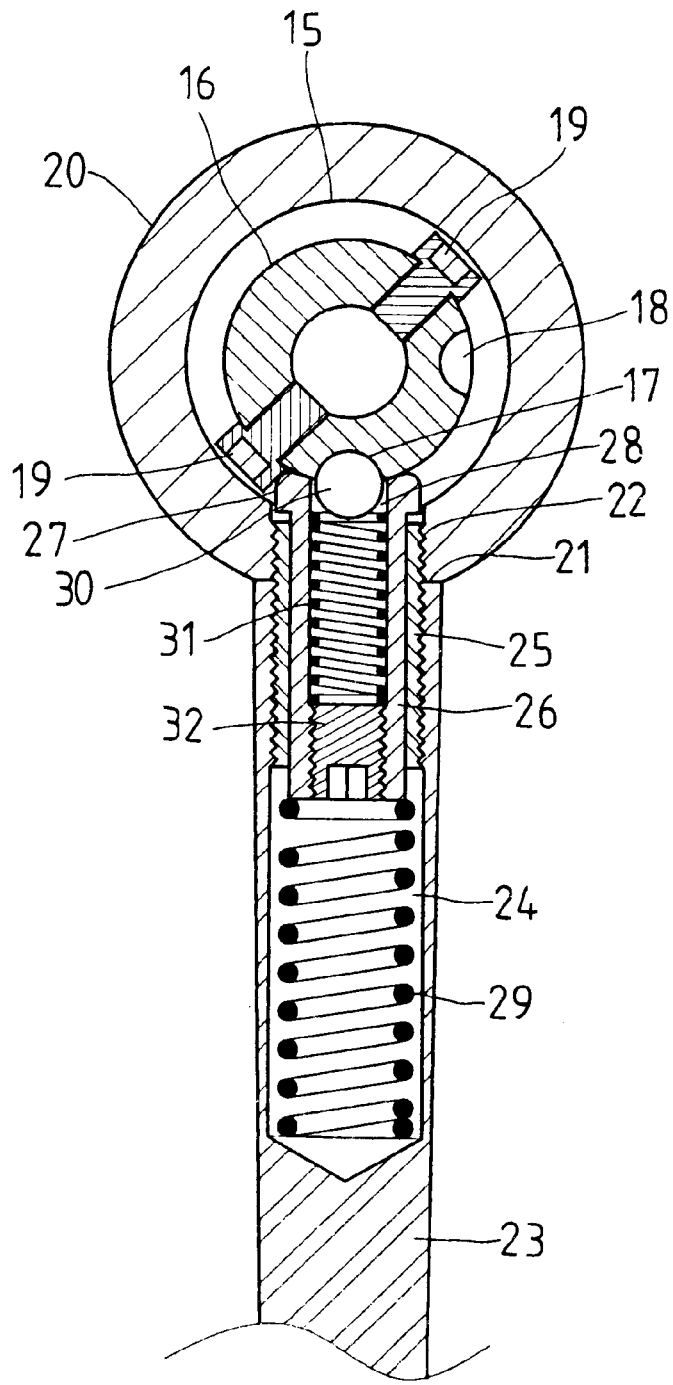
FIG. 3 snows a sectional view of the present invention in combination.
Figure 4:
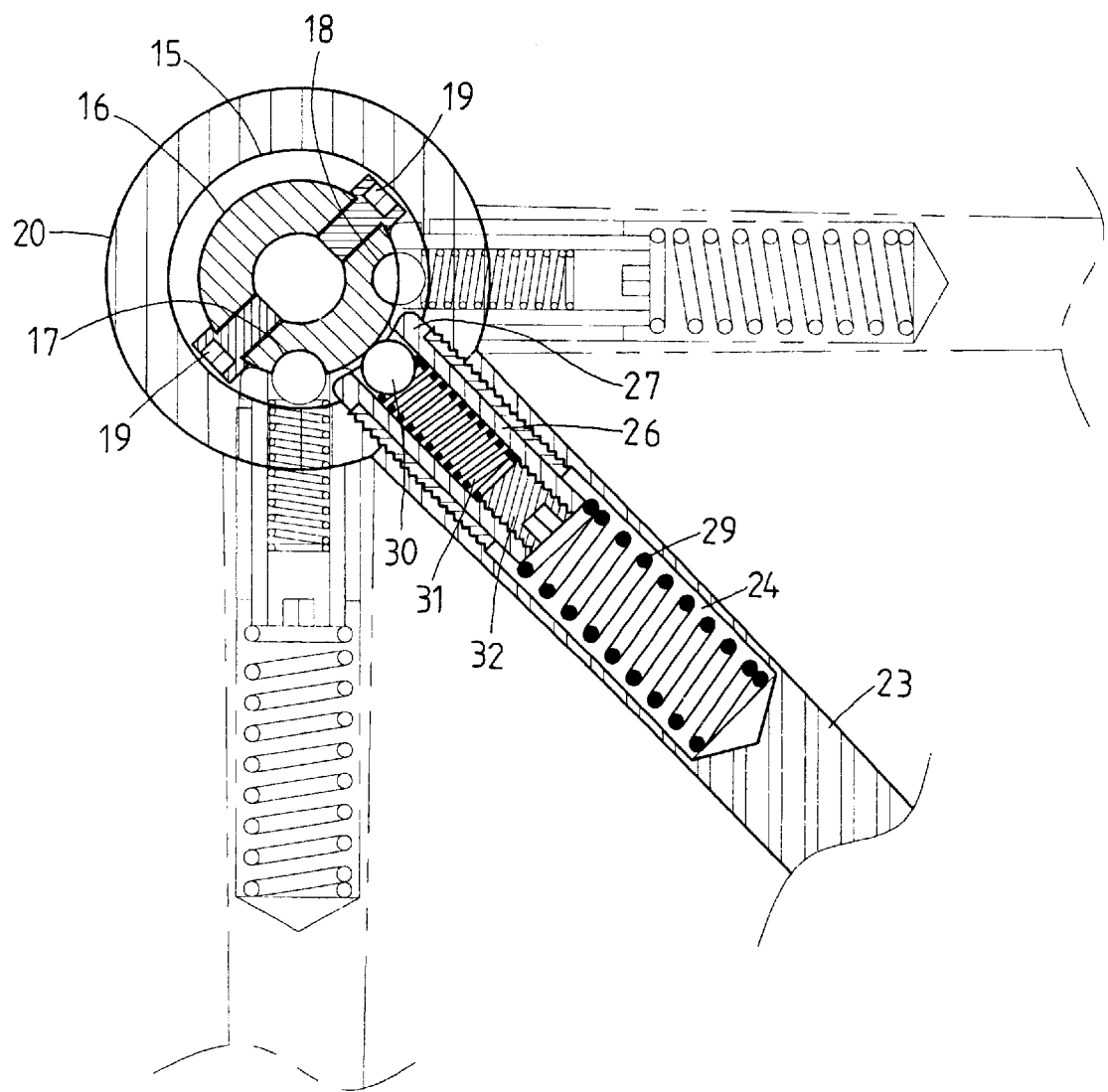
FIG. 4 shows a schematic view of the present invention in operation.

A frame rod 23 is provided with a receiving hole 24 at the top end thereof. The open edge of receiving hole 24 uses a screw tube 25 so as to let the frame rod 23 fastened with the plane 21 which has the tapper hole 22 inside the revolving body 20 (as shown in FIGS. 3 and 4).

A guide tube 26 is provided cross through with the inside screw tube 25. The end of the guide tube 26 extended flangely to the receiving hole 24 of the frame rod 23 and to the revolving body 20 at the top end thereof. The halved ring 16 corresponding to the shaft body 15 provided with a halved head 27 which has provided with a longitudinal trough hole 28.

A tension member 29 is provided with the receiving hole 24 of the frame rod 23, and fastened with the guide tube 26 at one end thereof.

An elastic member 31 is provided with the trough hole 28 of the guide tube 26.

A steel ball 30 is further provided with the trough hole 28 of the guide tube 26. The steel ball 30 is forced to strengthen to the halved ring 16 of the shaft body 15 with a support by the elastic member 31, and further to strengthen to the fixed groove 17 or to the location of the halved groove 18.

The trough hole 28 of the guide tube 26 is provided with cross through device in order to match an adjusting block member 32 to adjust the elastic member 31 so as to make the steel ball 30 having the power to support in operation, and further to adjust the tension and relaxation of the revolving and standing of the frame rod 23. The frame rod 23 is further provided with a steady block 33.

With the structure member as described above, the screw tube 25 is fastened with the revolving body 20 which has the frame rod 23, and further fastened pivotally with the cramp 11 which has the halved ring 16 at the shaft body 15 thereon. The guide tube 26 which is provided to match with the screw tube 25 corresponding to the halved ring 16 inside the revolving body 20 formed a halved head 27. This is to achieve the limited place in pivoting between the revolving body 20 and the shaft body 15. The trough hole 28 of the guide tube 26 is put orderly the elastic member 31 and the steel ball 30. The steel ball 30 is forced to strengthen to the fixed groove 17 or the halved groove 18 of the halved ring 16 with a support by the elastic member 31. So that the frame rod 23 enable to revolve and stand firmly in operation. The screw 19 provided with the fixed groove 17 and the halved groove 18 thereon providing the halved head 27 of the guide tube 26 enable to turn around in its limited place, so that to make easy the steel ball 30 forced to strengthen to the fixed groove 17 or the halved groove 18. The tension member 29 which is strengthened to the bottom end of the guide tube 26 enabling to let the halved head 27 of the guide tube 26 easily to slide on the round edge of the halved ring 16 of the shaft body 15, so that to ensure the firmly strengthened of the steel ball 30.

The embodiment of the present invention described above is to be deemed in all respects as being illustrative and not restrictive. Accordingly, the present invention may be embodied in other specific forms without deviating from the spirit thereof. The present invention is therefore to be limited only by the scopes of the following appended claims.

I claim:

1. A bicycle foot rest comprising:

a cramp is fastenec with a screw at an open edge, said cramp is located fixedly on the bicycle frame rod body, at the opposite side of said open edge of said cramp provided with a shaft body which has a halved ring, at an appropriated location of said halved ring provided with a fixed groove and a halved groove, there is a screw fastened therewith between said fixed groove and said halved groove;

a revolving body is fastened pivotally with the shaft body of said cramp, said revolving body is provided with a plane which is connected through a tapper hole inside of said revolving body;

a frame rod is provided with a receiving hole at the top end thereof, at the open edge of said receiving hole uses a screw tube to let said frame rod fastened with the plane which has the tapper hole inside the revolving body;

a guide tube is provided cross through inside the screw tube, the end of said guide tube extended flangely to the receiving hole of the frame rod, and extended flangely to the revolving body at the top end thereof, the halved ring corresponding to the shaft body provided with a longitudinal trough hole;

a tension member is provided with the receiving hole of the frame rod and fastened with the guide tube;

an elastic member is provided with the trough hole of the guide tube; and a steel ball is further provided with the trough hole of the guide tube, said steel ball is forced to strengthen to the halved ring of the shaft body with a support by the elastic member, and further to strengthen to the fixed groove or the halved groove.

2. The bicycle foot rest as defined in claim 1, wherein said trough hole of said guide tube is provided with cross through device in order to match an adjusting block member to adjust the elastic member so as to make the steel ball having the power to support in operation, and further to adjust the tension and relaxation of the revolving and standing firmly of the frame rod in place.

3. The bicycle foot rest as defined in claim 1, wherein said frame rod is further provided with a steady block at the bottom end thereof.

* * * * *